July 19, 1960 C. M. CHERRIER 2,945,797
MANUFACTURE OF METALS OF HIGH PURITY
Filed May 9, 1957 3 Sheets-Sheet 2
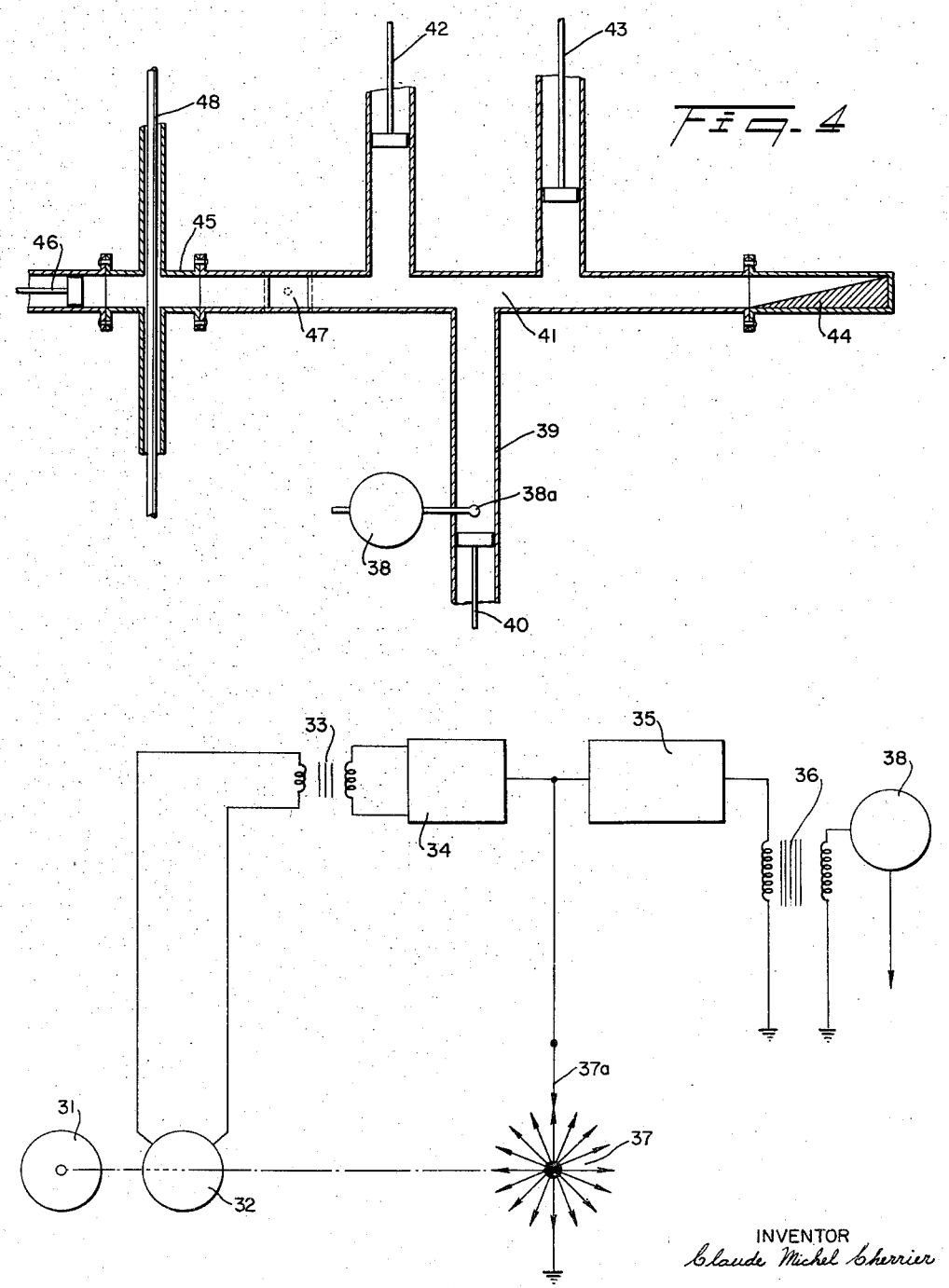
INVENTOR
Claude Michel Cherrier
BY
Bauer and Seymour
ATTORNEYS

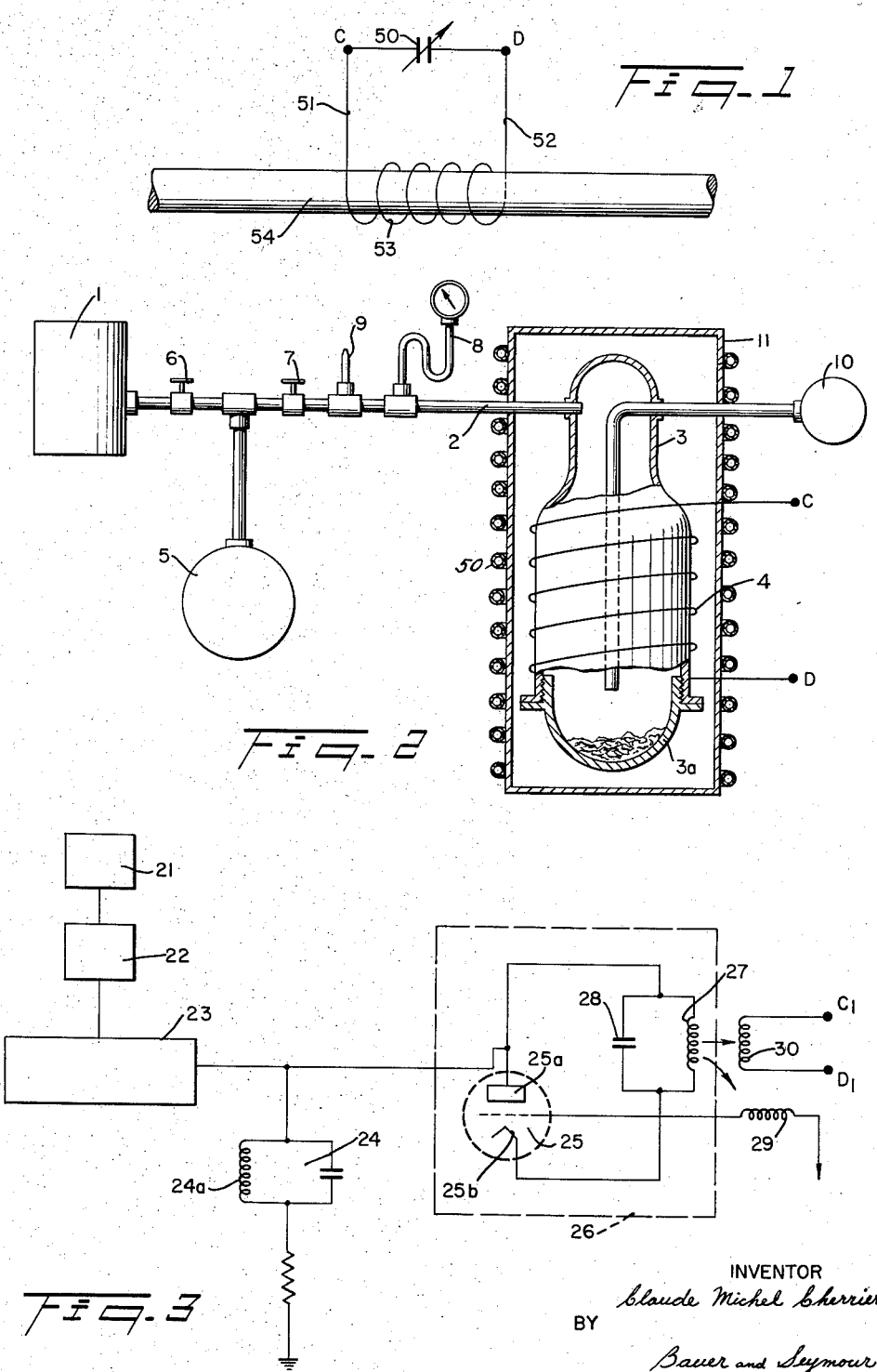

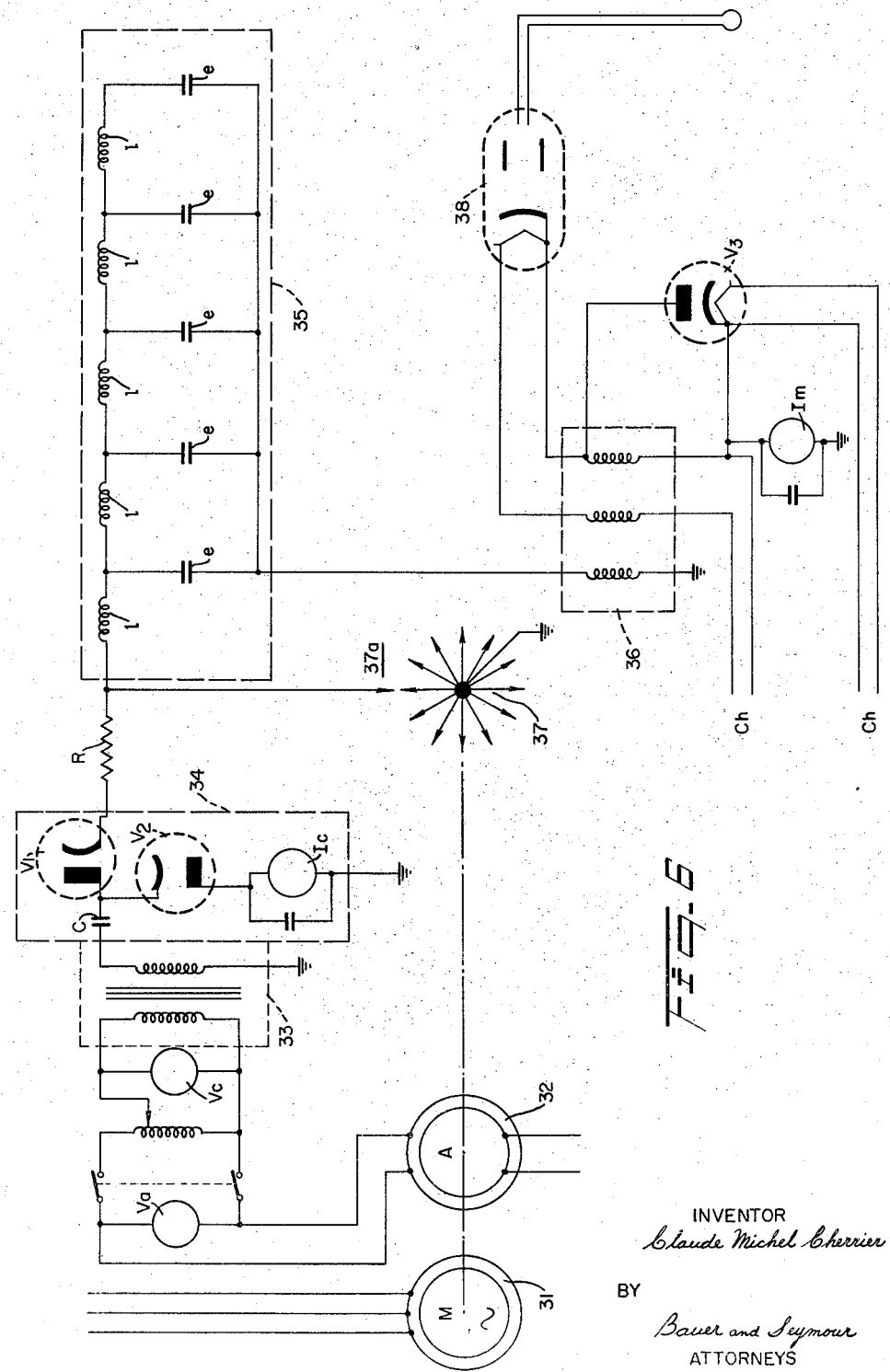

United States Patent Office 2,945,797
Patented July 19, 1960

2,945,797

MANUFACTURE OF METALS OF HIGH PURITY

Claude Michel Cherrier, St. Mande, France, assignor to Societe Anonyme des Manufactures des Glaces et Produits Chimiques de St. Gobain, Chauny and Cirey, Paris, France Filed May 9, 1957, Ser. No. 658,129

Claims priority, application France May 12, 1956

8 Claims. (Cl. 204—164)

This invention relates to the manufacture of metals in a state of high purity and is particularly adapted to the production of high purity silicon.

Heretofore it has been proposed to prepare high purity silicon by reducing vapor phase silicon tetrachloride with zinc at high temperature or to decompose a silane by heat. Those methods have the imperfection of involving the contact of solid silicon with the walls of the apparatus at high temperature. The rate of diffusion of foreign atoms into silicon increases rapidly with the increase of temperature, so that those methods always involve material risk of contaminating the silicon with the materials of the apparatus with which it comes in contact.

It is an object of this invention to produce substantially uncontaminated silicon.

Another object is to produce other metals in substantially uncontaminated state.

Another object is to eliminate the contamination of silicon and such metals by the material of the apparatus in which they are made.

Another object is to decompose metal hydrides in gas phase at low temperature and in apparatus free of electrodes.

The objects as to process are accomplished, generally speaking, by decomposing a silane or a gaseous hydride or other metal by induction, an electrical discharge being within the gas itself without using electrodes which contact the gas. The process is carried out in apparatus having a reaction chamber through which the silane or other metal hydride in gas phase is passed, under preferably reduced pressure, containing no electrodes in contact with the gas as they would be sources of contamination, and by inducing electrical discharges, by an alternating field, which term includes pulsating fields, in the gas. During the reaction the apparatus, the locus of the reaction, may be easily kept at room temperature, or may even be cooled below it, so that the metal powder formed does not, in contact with the apparatus, become contaminated and is consequently pure.

The electric discharge may be produced within the gas to be decomposed by low frequency, high frequency, very high frequency and hyperfrequency current. The phenomenon is not the result of a particular frequency but occurs at all frequencies. The current used, and the discharge resulting, may be continuous as in sine wave alternating current, or intermittent, as in pulsating current.

The raw materials useful in this process are those metal hydrides which can be made gaseous at temperatures below those at which contamination by the walls of the reaction vessel begin. This includes the silanes, which are considered as metal hydrides for the purposes of this specification, the best example of which is $SiH_4$, and germanium-methane, $GeH_4$, which are gaseous at ordinary temperature and pressure.

The disintegration by induction may be carried out at atmospheric pressure or below, but it is desirable to use reduced pressure, pressures below atmospheric being preferred. The use of excessively low pressure is not necessary as the process goes well at several cm. of Hg.

Any apparatus capable of inducing an electrical discharge within the gases is useful, but the invention includes novel apparatus described and shown in the drawings, wherein:

Fig. 1 is a diagrammatic view of a simple but successful apparatus;

Fig. 2 is a diagramamtic view of a more versatile apparatus operating by the principles of Fig. 1;

Fig. 3 is a diagram of an apparatus operating by pulsating current with wave length on the order of a meter to a kilometer;

Fig. 4 is a diagram of an apparatus of pulsating type generating waves of length on the order of centimeters;

Fig. 5 is a diagram of a wave generator suited to the electrical supply of the apparatus of Fig. 4;

Fig. 6 is a completed diagram of apparatus blocked out in Fig. 5.

Referring now to the construction of Fig. 1, there is at 50 a source of high frequency alternating current of continuous wave or reversing type which supplies an induction coil 53 which is coiled about a horizontal tube 54 (of quartz, glass, plastic) through which a current of a silane may be passed at less than atmospheric pressure. Evacuation means and gas supply means are well known and are not shown in the drawing. The power sent to the coil 53 is sufficient to induce an electrical discharge that fills the tube. For example, for 500 liters per hour of silane or germanium methane passing through a tube of from 20–50 mm. diameter at a pressure of about 2 cm. of Hg, one may use 5 kilowatts at a frequency of oscillations of 3 megacycles per second. This is the simplest form of successful apparatus. As the gas progresses through the tube, part of it is disintegrated by the discharge, releasing hydrogen and depositing metallic Si in a pure state. The tube can be cooled if the power used tends to raise its temperature close to the point of contamination.

The current generating means between C and D on the drawing may be of ordinary construction, such as is described in Radio Engineers' Handbook, F. E. Terman, 1943. When vacuum is used, as it is in the preferred form of the invention, it is applied by a pump, a cold trap being introduced in the pump line, this being standard low-pressure technique and not illustrated.

In Fig. 2 is an apparatus of similar electrical construction but more versatile. It includes a source of silane 1 which supplies a pipe 2 through valves 6 and 7 with the gas, which is delivered to a reaction chamber 3 about which is wound an induction coil 4 which is supplied with high frequency alternating current through terminals C and D. The lower part 3a of the vessel 3 is removable to permit the occasional emptying of deposited metal. A source of suction 10 reduces the pressure within the vessel 3, a manometer 8 reveals the pressure in the system, a very small pipe 9 with a tiny orifice cooperates with the suction means 10 to maintain a pressure of several centimeters of Hg in the apparatus. A large reservoir or pressure dome 5 serves to regulate the flow of silane by absorbing differences in pressure and rate of flow. The reaction chamber is within an enclosure 11 which can be cooled if necessary or desirable to reduce the temperature of the reaction vessel. The reaction may be arrested during the emptying of 3a. Cooling means designated 50, in the form of a refrigerator coil, is shown surrounding container 11 in Fig. 2. It is assumed that C, D in Fig. 2 are connected to the source 50 of Fig. 1. The current may be presumed, for these figures, to be on the order of several megacycles per second.

In Fig. 3 is shown a pulsating current generator adapted to be attached at $C_1D_1$ to the terminals CD of Figs. 1 or 2. The apparatus shown in blocks is of known type needing no detailed description. Thus, an oscillator 21 furnishing a frequency of 1000 cycles per sec. is connected to an oscillation generator 22 wherein it undergoes successive transformation in the several stages. The apparatus 21, 22, 23 is sufficiently well known to need no detailed description, yet it may be stated that it includes, in sequence, a stage limiter, a deviation circuit, a stage limiter, an amplifier, a stage basculer, and a stage amplifier which is connected to the modulator 23. The current from modulator 23 is put out as impulses of negative voltage sufficient to insure unblocking. The modulator 23 may be constituted by two stage amplifiers placed in series supplying a circuit including a condenser 24 and an inductance 24a of which the discharge produces pulsations supplying the plate 25a of tube 25 of oscillator 26.

Oscillator 26 includes a tube 25 in a tuned circuit including in the circuit the anode 25b, plate 25a, condenser 28, and inductance 27 in parallel, and a reaction inductance 29 connected to the grid. The triode 25 in an actual apparatus furnished a power of 100 kilowatts in a sequence of impulses of 3 microseconds. The frequency of recurrence was 1000 cycles per second; the frequency of use was 30 megacycles. The induction coil 30 is activated by the impulses from coil 27 and delivers its potential to terminals $C_1D_1$ which may be connected to CD of Fig. 2 or Fig. 1. Such apparatus serves to produce wave lengths on the order of a meter to a kilometer.

If shorter wave lengths are desired, e.g. measured in centimeters rather than meters, one may employ wave guides and resonant chambers, an example of which is shown in the novel apparatus of Figs. 4 and 5. In those figures an alternator 32, driven by a motor 31, provides alternating current, e.g. of 500 periods per second, to a high tension transformer 33 which delivers the output to a voltage doubling circuit 34. The undulating current thus produced supplies an artificial line 35 composed of resistances and capacities in parallel (as in Fig. 3) which discharge across a pulsation transformer 36 with a periodicity established by rotary sparking means 37 connected to ground between 34 and 35 and including tungsten bars spaced about the periphery of a wheel rotated by motor 31. Opposed bars are connected together and connect the line 37a to ground intermittently as the wheel 37 turns, by sparks which close the discharge circuit of the line. Thus very high voltage impulses are sent to the pulsation transformer 36, which charges the magnetron 38 which, at each pulsation, emits high frequency waves of the order of 3000 megacycles.

The high frequency energy is transmitted to the resonant chamber (Fig. 4) as the high frequency wave is radiated from the end 38(a) of the magnetron, which is a small ball supported within the wave guide 39. The tuning of the waves emitted by the magnetron-guide is done by a regulatory piston 40 placed at one extremity.

In order to transmit the power continuously from the magnetron to the chamber 45 on one side and the absorption fixed charge 44 on the other, which may be a mass of water or graphite, and this in proportions decided on in advance, one uses a power divider 41 comprising two tuning pistons 42, 43, one on each side of the guide containing the magnetron, which are made by regulation to divide the power between 44 and 45 as desired. The axes of the pistons are desirably spaced by a distance of $$\frac{3\lambda}{4}$$

$\lambda$ being the wave length in the guide, e.g. 10 cm. The tuning of the chamber 45 is accomplished by two pistons, 46 and 47, of which 46 is placed in the prolongation of the wave guide, beyond chamber 45, and 47 before the chamber in a horizontal plane perpendicular to the wave guide. The chamber 45 is intersected by the tube 48 which is, like tube 54, a carrier of the gas to be disintegrated, under reduced pressure.

This wave generating apparatus is representative of a known type for generating high-frequency oscillations and has its principles disclosed in M.I.T., vol. 5, chapter 6, page 175; vol. 5, chapter 7, page 224; vol. 5, chapter 8, page 275; and M.I.T., vol. 6, "Magnetron." Thus, the wave generating apparatus, per se, is not claimed to be new but it is believed to be new in its structure for, and its application to, the disintegration of metal hydrides.

The following examples illustrate the invention without limiting the generality of what is elsewhere herein stated and claimed.

*Example 1*

Using an apparatus of the type of Fig. 2 having a coil 4 of ten turns of 10 cm. diameter through which a continuous, alternating, high-frequency current is sent from a 5 kilowatt generator with a frequency of 3 megacycles per second. These turns produce discharges in rings in the reaction chamber. The reaction chamber has a volume of 200 cm. and is traversed by the silane under a pressure of 5 cm. of mercury. The rate of gas flow, instituted by a piston pump, not shown, is about 500 liters per hour measured at atmospheric pressure. The quantity of silicon recovered per hour of operation is about 150 grams, which represents a yield of about 24% with relation to the silane decomposed.

*Example 2*

The apparatus is described in Figs. 4 and 5. The silane passes through a tube 48 of 5 cm. diameter which intersects the wave guide. The wave guide receives impulses of a duration of 1 microsecond with a frequency of repetition of 500 pulsations per second; the wave power is 1 megawatt, and the carrier wave frequency is of 3,000 megacycles per second for a wavelength of 10 cm.; the mean power in the wave guide is thus about 500 watts.

The silane is sent through the apparatus at about 200 liters of gas per hour measured at atmospheric pressure. The quantity of silicon recovered at the end of 2 hours of operation is about 95 grams, which indicates a yield of about 19% with respect to the silane decomposed.

The foregoing examples have described the manufacture of extra pure silicon by the decomposition of a silane. The invention has a more general character and is applied in an analogous way to the manufacture of other metals susceptible of forming stable gaseous hydrides. The process is particularly adapted to the production of germanium by the decomposition of germano-methane ($GeH_4$). The following example illustrates the manufacture of germanium:

*Example 3*

Using the apparatus of Example 1 in which a 1-kilowatt generator sends a high-frequency current of continuous waves with a frequency of 500 kilocycles per second, there was produced for a rate of germano-methane supply of 250 liters per hour measured at atmospheric pressure, after ½ hour of operation, 117.5 grams of germanium, which indicates a yield of 29% based on the germano-methane decomposed.

An advantage of the process resides in the fact that the reaction chamber may easily be maintained at room temperature or below, so that the contact of the silicon powder with the walls of the apparatus does not induce any contamination of the product.

Other advantages of the invention are derived from the novel apparatus which has been conceived for carrying out the process. A particular advantage arises from the novel apparatus and method of Figs. 5 and 4, in which a wave guide, including a tunable resonant cavity intersected by a gas filled reaction tube, is filled with very short waves, of the order of a centimeter, by an energized magnetron.

Another advantage of the invention is in the production of metals in a very high state of purity, silicon being considered a metal for the purposes of this specification, by the disintegration of their gaseous hydrides, preferably at reduced pressure.

The apparatus described is adapted to carry out the process at high pressure, atmospheric pressure, and reduced pressure. It may be easily regulated to produce optimum conditions of reaction. It is adapted to produce whatever wave lengths are preferred for and most efficient in the destruction of particular silanes and other metal hydrides.

As many apparently widely different embodiments of the present invention may be made without departing from the spirit and scope thereof, it is to be understood that the invention is not limited to the specific embodiments.

What is claimed is:

1. The method of producing elementary metals and metalloids in a state of high purity which comprises flowing through an inert reaction zone, which is protected from contact with contaminating substances by an inert wall, a continuous current of a hydride of an element from the class of metals and metalloids in gas phase, and inducing in the gas itself within the zone an electrodeless discharge by imposing upon the gas, through the wall, an alternating electrical field.

2. The method of producing elementary metals and metalloids in a state of high purity which comprises establishing an inert reaction zone, flowing a current of a hydride of an element from the class of metals and metalloids in gas phase through the inert zone, and inducing in the gas in the zone, from outside the zone, an alternating electrodeless discharge.

3. The method of producing a high purity metal as defined in claim 1, which comprises maintaining all objects within the reactor, including the inner surface of the reactor, which are in contact with the metallic products formed by the action of the electrical discharge upon the hydride, at a temperature below that at which contamination of the product by such objects occurs.

4. The method of producing a high purity metal as defined in claim 1, which comprises reducing the pressure within the reactor below atmospheric pressure during the action of the electrical discharge upon the hydride.

5. The method of producing a high purity metal as defined in claim 1, wherein the metal is silicon.

6. The method of producing a high purity metal as defined in claim 1, wherein the metal is germanium.

7. The method of producing a high purity metal as defined in claim 1, wherein the metal hydride is a silane.

8. The method of producing a high purity metal as defined in claim 1, wherein the metal hydride is germanomethane.

References Cited in the file of this patent

UNITED STATES PATENTS

| | | |
|---|---|---|
| 1,909,680 | Hunter | May 16, 1933 |
| 2,117,100 | Milas | May 10, 1938 |
| 2,162,996 | Dawsey | June 20, 1939 |
| 2,163,898 | Lande | June 27, 1939 |
| 2,257,177 | Luster | Sept. 30, 1941 |
| 2,313,028 | Siegmann | Mar. 2, 1943 |
| 2,331,402 | Leete | Oct. 12, 1943 |
| 2,364,940 | Bies | Dec. 12, 1944 |
| 2,683,256 | Kumpfer | July 6, 1954 |
| 2,684,329 | Rouy | July 20, 1954 |
| 2,711,517 | Krutter et al. | June 21, 1955 |
| 2,768,074 | Stauffer | Oct. 23, 1956 |

OTHER REFERENCES

Mellor: "Comprehensive Treatise on Inorganic and Theoretical Chemistry," vol. 6, 1925, page 219.

Dufour: Competes Rendus, vol. 138 (1904), pp. 1169–1170.

Ogier: Comptes Rendus, vol. 89 (1879), pp. 1068–1069.

Berthelot: Annales de Chimie et de Physique (5th series), vol. 10 (1877), pp. 75–82.

Ogier: Annales de Chimie et de Physique (5th series), vol. 20 (1880), pp. 33–34.